(12) United States Patent
Schmid

(10) Patent No.: US 9,993,908 B2
(45) Date of Patent: Jun. 12, 2018

(54) PNEUMATICALLY POWERED LOCOMOTIVE SANDER

(71) Applicant: CYCLONAIRE CORPORATION, York, NE (US)

(72) Inventor: Scott M. Schmid, York, NE (US)

(73) Assignee: CYCLONAIRE CORPORATION, York, NE (US)

( * ) Notice: Subject to any disclaimer, the term of this patent is extended or adjusted under 35 U.S.C. 154(b) by 0 days. days.

(21) Appl. No.: 15/092,457

(22) Filed: Apr. 6, 2016

(65) Prior Publication Data

US 2016/0297624 A1 Oct. 13, 2016

Related U.S. Application Data

(60) Provisional application No. 62/144,468, filed on Apr. 8, 2015.

(51) Int. Cl.
*B65G 53/40* (2006.01)
*B24C 1/00* (2006.01)
*B65G 53/60* (2006.01)

(52) U.S. Cl.
CPC .............. *B24C 1/00* (2013.01); *B65G 53/60* (2013.01)

(58) Field of Classification Search
CPC ........ B65G 53/12; B65G 53/36; B65G 53/42; B65G 53/66; B65G 65/30; B65G 67/06; B65D 88/72; B65D 88/548
USPC ................................. 406/175, 174, 168, 154
See application file for complete search history.

(56) References Cited

U.S. PATENT DOCUMENTS

| | | | | | |
|---|---|---|---|---|---|
| 1,775,911 | A | * | 9/1930 | Nagel | B65G 53/42 239/592 |
| 3,279,861 | A | * | 10/1966 | Hubbard | B65G 53/66 406/105 |
| 3,460,692 | A | * | 8/1969 | Pot | B65G 53/30 193/29 |
| 3,844,446 | A | * | 10/1974 | Solt | B65G 53/66 141/198 |
| 4,388,948 | A | * | 6/1983 | Carminati | B67D 9/02 137/615 |
| 4,674,922 | A | * | 6/1987 | Federhen | B65G 53/4691 137/240 |
| 5,518,343 | A | * | 5/1996 | Howell | B01D 46/02 406/146 |
| 5,707,198 | A | * | 1/1998 | Vind | B01J 3/02 406/175 |
| 6,419,425 | B1 | * | 7/2002 | Fourcroy | B61K 11/00 406/120 |
| 6,666,642 | B2 | * | 12/2003 | Fourcroy | B61K 11/00 414/339 |

* cited by examiner

*Primary Examiner* — William R Harp
(74) *Attorney, Agent, or Firm* — Greer, Burns & Crain, Ltd.

(57) ABSTRACT

A separation device is provided for use with a locomotive sanding system, and includes a body defining a chamber and having an intake port connected to an inlet tube with a free end spaced from a floor of the body, an outlet port at an opposite end of the body from the intake port, a sand fill hose connected to the outlet, and a sand nozzle connected to the sand fill hose.

10 Claims, 3 Drawing Sheets

PNEUMATICALLY POWERED LOCOMOTIVE SANDER

RELATED APPLICATION

This application is a Non-Provisional of, and claims 35 USC 119(e) priority from U.S. Ser. No. 62/144,468 filed Apr. 8, 2015.

BACKGROUND

The present invention relates generally to systems for providing sand to locomotives for improving traction and stopping performance on steel rails, and more specifically to an improved sand delivery system, incorporating a pressurized sand distribution chamber.

Conventional locomotives have internal, pneumatically pressurized sand delivery systems used to blow sand onto the rails in advance of the traction wheels. These systems periodically need refilling. Locomotive sand refilling systems are known in the art, and have been provided in various configurations. Historically, sand was delivered to the locomotives by elevated gravity tanks with downspouts. In other systems, an operator rides in a cab elevated above the track on a rolling gantry system. The operator manually controls a nozzle from a central hopper to deliver sand into a designated compartment in the locomotive. The industry gradually adopted systems that provide sand under pressure. In a typical pneumatic system, sanding stations are positioned along the track and receive sand from a central hopper. Each tower has at least one distribution hose that operators manipulate to align with the locomotive intake. Sand is then propelled pneumatically directly into the locomotive hopper A common problem with traditional gravity locomotive sanding systems is a relatively large infrastructure cost in gantries, towers, and related accessories. However, in such systems it is still difficult to properly align the locomotive under the sand distribution point. A drawback of the newer, pneumatic conventional locomotive sand delivery systems is that operators often have to manually position the sand delivery hose in the locomotive intake, and the heavy, unwieldy hose is difficult to maneuver. Unwanted sand spills can result. Still another problem of conventional locomotive sanding systems is the significant amount of dust that is generated during the filling process.

Yet another drawback of conventional sand refilling systems is that they include sensors for determining when the locomotive is full, to prevent sand from over-feeding. This sensing system adds complexity, and can fail. Also, the sensing system requires that a probe stick be inserted into the locomotive sandbox, which is often guarded with a screen. The hose must also be "purged" by blowing it clear to reduce its weight before removal by an operator. Finally, the motive air used to propel the sand creates some dust, which can be a safety issue due to the danger of silicosis for operators.

SUMMARY

The above-listed needs are met or exceeded by the present, pneumatically pressurized locomotive sand delivery system. In the present system, there is a constant supply of pressurized sand, originating from a central source such as a hopper. From the hopper, pneumatic pressure forces sand through delivery conduits such as pipes or hoses. A separation device, receiving vessel or distributor is connected to the sand delivery conduits, and is suspendable above the locomotive and thus can feed the sand by gravity. The pneumatic system fills the vessel so that there is a supply for immediate use by gravity. At an outlet of the vessel, a hose has a conventional gravity feed sand nozzle. A preferred type of sand nozzle is sold by Monroe Engineering, Marion, Iowa.

In addition to a pressurized sand inlet conduit or hose, the vessel also has a dust collection outlet hose, preferably connected to a source of vacuum, for removing dust generated during the sand filling process. An optional feature is a sight glass on the vessel that indicates when the vessel is about to be filled with sand.

Still another feature of the present vessel is the internal sand filling feature. An inlet pipe has a lower end spaced from a floor of the vessel. As the sand is pumped through the inlet pipe, the sand will eventually reach a level below the sight glass, and will plug the inlet, preventing additional sand from entering the vessel through the creation of back pressure on the pneumatic feed of sand from the main hopper. While the flow of sand to the vessel is stopped, the sand supply system remains pressurized. As sand is dispensed from the outlet hose using the nozzle, the sand level in the vessel will decrease, allowing refilling by the pressurized main system. Thus, there is a virtually unlimited supply of sand available for the locomotive, as long as the main system hopper is refilled. This is a great advantage for system operation, because the pneumatic re-fill becomes self-regulating from a flowrate perspective, and is self-starting/stopping, without the use of valves or sensors.

Since the present system is suspended above the locomotive, there is less required manipulation by operators. Also, the internal dust collection system reduces the amount of dust generated during filling. Since the present sand delivery apparatus is more easily manipulated by operators, there is less spilling of sand.

More specifically, a separation device is provided for use with a locomotive sanding system, and includes a body defining a chamber and having an intake port connected to an inlet tube with a free end spaced from a floor of the body, an outlet port at an opposite end of the body from the intake port, a sand fill hose connected to the outlet, and a sand nozzle connected to the sand fill hose.

In another embodiment, a locomotive sand delivery system is provided, including a hopper, a pressurizing apparatus constructed and arranged for drawing sand from the hopper and feeding it under pressure to a sand delivery conduit, a support frame associated with the hopper and supporting a pivoting beam, and a separation device movably connected to the beam. The separation device constructed and arranged for receiving sand under pressure from the hopper and delivering the sand by gravity to a locomotive.

DETAILED DESCRIPTION

Figure 3:
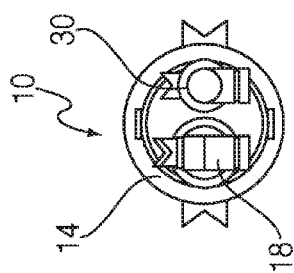
FIG. 3 is a top view of the delivery vessel of FIG. 1.
Figure 2:
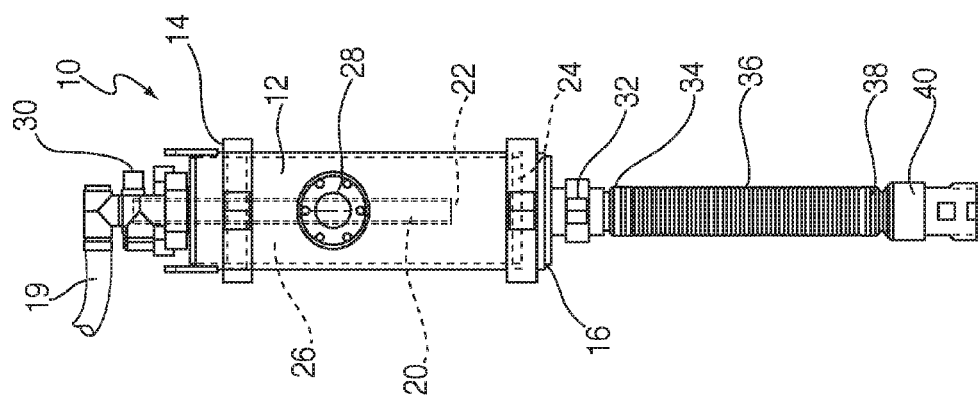
FIG. 2 is a side view of same.
Figure 1:
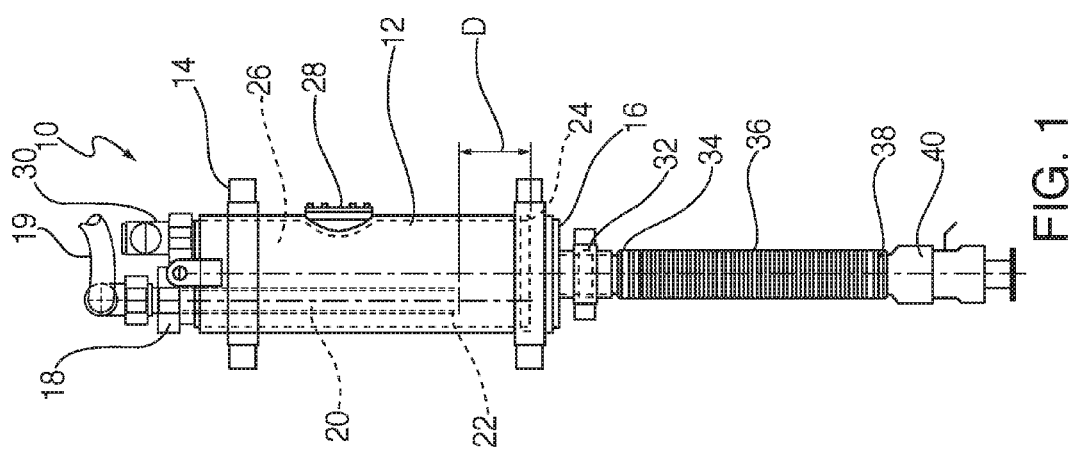
FIG. 1 is a front elevation of the present sand delivery vessel.

Referring now to FIGS. 1-3, the present sand distribution vessel or separation device is shown, generally designated 10, including a body 12 with an upper end 14 and a lower end 16. The body 12 is generally cylindrical, however other shapes are contemplated. Also, the body 12 is constructed and arranged for accommodating the intake of sand under pneumatic pressure. At the upper end a first, intake port 18 is in fluid communication with a pneumatically pressurized sand delivery conduit 19, such as a flexible hose or the like, for receiving sand under pressure. The intake port 18 is connected to an internally projecting inlet tube 20 with a free end 22 terminating above a floor 24 that defines the lower end 16. A distance "D" is defined between the free end 22 and the floor 24, which may vary to suit the application, but relates to how much sand is retained in an internal chamber 26 defined by the body 12 until sufficient back pressure is created to stop the incoming flow. The internal chamber 26 holds about 1 cubic foot of sand, but the amount may vary to suit the situation.

A sight glass 28 is optionally disposed in the body 12 to permit visual monitoring of the sand level within the chamber 26. It is contemplated that when the sand level in the chamber 26 is sufficiently high to stop incoming sand flow, the level will be below the sight glass 28. Also located at the upper end 14 is a dust exhaust port 30, connectable to a powered vacuum line (not shown). In the preferred embodiment, the port 30 is adjacent the intake port 18, however other positions are contemplated.

At the lower end 16 of the body 12, an outlet port 32 is connected to a first end 34 of a flexible sand fill hose 36. It is contemplated that the length and diameter of the hose 36 may vary to suit the application. At a second, opposite end 38 of the hose 36, also referred to as a gravity discharge point is mounted a conventional sand fill nozzle 40. Such nozzles 40, also called sanding nozzles are well known in the art, and a suitable model is produced by Monroe Engineering of Marion, Iowa. Such nozzles 40 were common on the conventional elevated sand towers, and use a simple outer housing that slides up to allow sand to flow through the internal channel when the outer housing is raised. The outer housing is designed to catch on a lip of the locomotive sandbox. So, by simply lowering the nozzle into the opening (causing the outer housing to slide up), gravity discharge is initiated, and pneumatic re-fill/supply accordingly begins.

Figure 4:
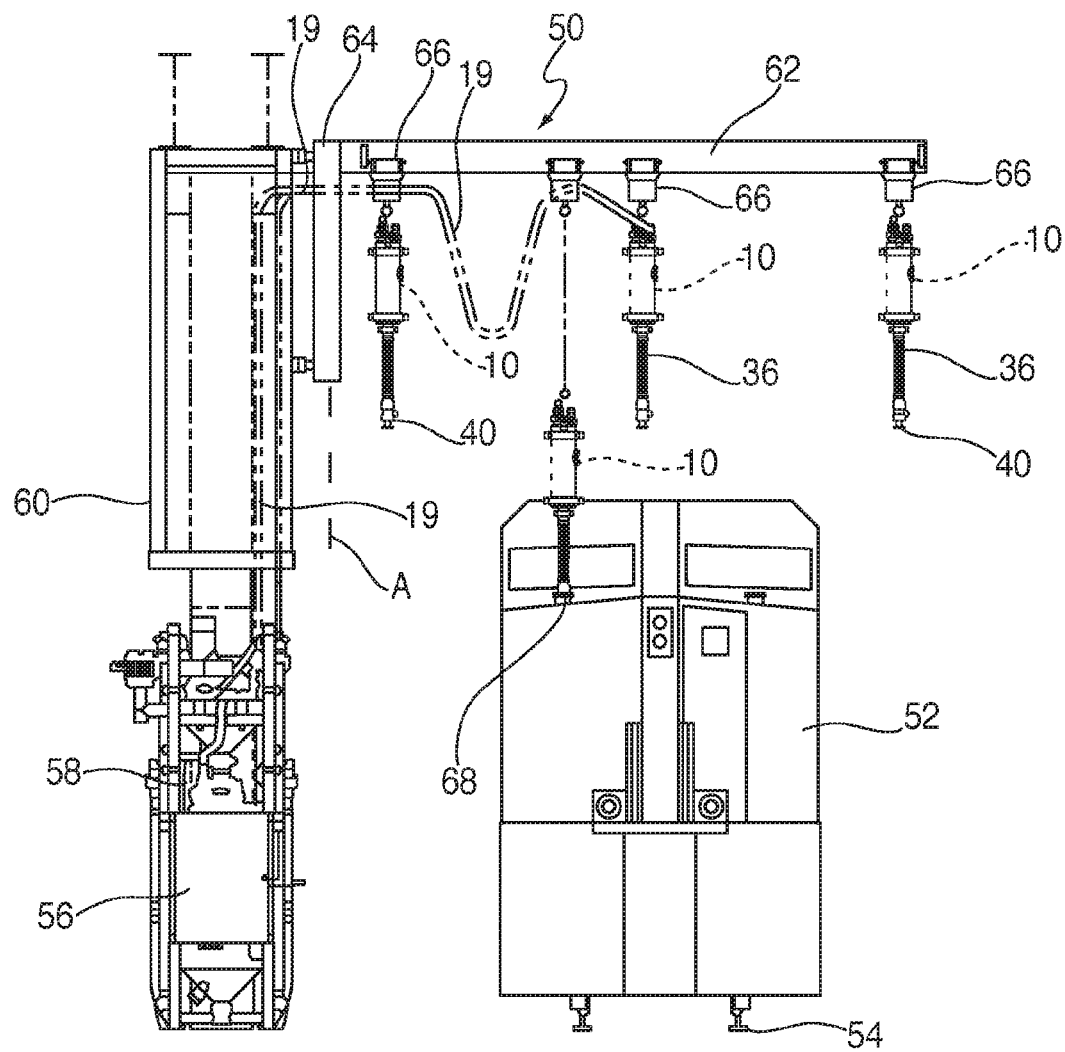
FIG. 4 is a front view of the present sand delivery system shown in relation to a locomotive.
Figure 5:
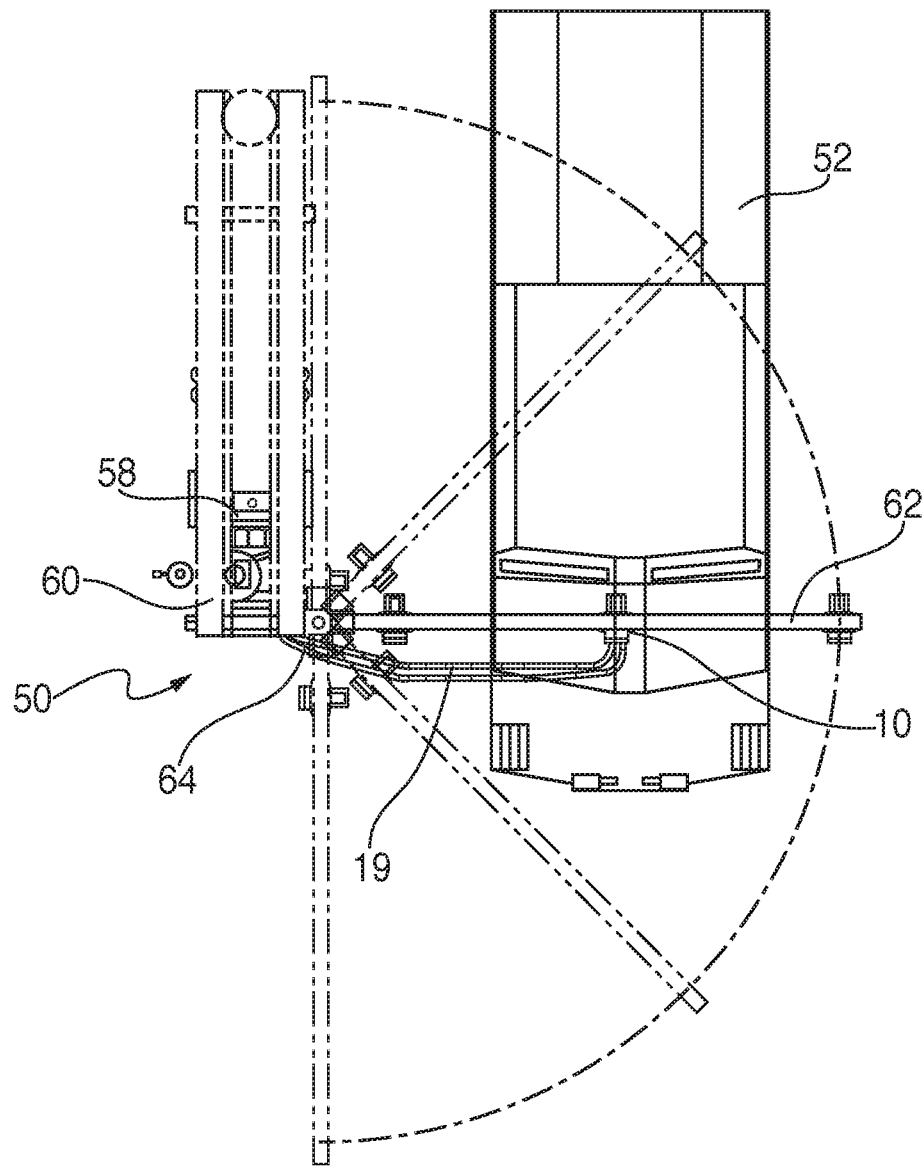
FIG. 5 is an overhead plan view of the system shown in FIG. 4.

Referring now to FIGS. 4 and 5, the present sand delivery system, is generally designated 50. A main component of the system 50 is the present sand delivery vessel 10, as described below. The system 50 is shown in relation to a conventional locomotive 52, shown on a track 54 and parked adjacent to the system, which is contemplated as being located in a railway maintenance yard.

Included in the system 50 is a hopper 56 storing a supply of sand, an a conventional pressurizing apparatus 58, including a compressor, that draws sand under pressure from the hopper 56 and forces the sand into the sand delivery conduit 19. A vertically projecting support frame 60 located adjacent the hopper 56 projects upward from an area adjacent the hopper and supports the sand delivery conduit 19. In addition, a movable, telescoping delivery beam 62 is pivotably mounted at a pivot end 64 to the support frame 60 for pivotal movement about a vertical axis "A" that is parallel to a vertical axis of the support frame 60. In the preferred embodiment, the pivot end 64 extends generally vertically relative to the frame 60, and the end 64 is vertically adjustable relative to the frame, however other mounting arrangements are contemplated.

The vessel 10 is slidably mounted to the delivery beam 62 via a conventional bracket or trolley 66, so that the vessel is suspended from the beam. As is known in the art, the vessel 10 is movable along the beam 62 by remote controlled actuators or hoist operated by an operator, who also controls the pivoting action of the beam, various pivoting positions shown in phantom in FIG. 5. The operator positions the vessel 10 above the locomotive sand fill intake opening 68 (FIG. 4). An advantage of the present system 50 is that the sand supplying device can be more accurately located relative to the intake opening 66 without undue manual positioning of a delivery hose, as is the case with many conventional systems. Once the vessel 10 is properly positioned relative to the intake opening 66, the operator lowers the vessel so that the nozzle 40 is in contact with the opening, and as is customary, the nozzle opens to begin the delivery of sand.

The vessel 10 operates so that the sand stored in the chamber 26 is delivered first to the locomotive, and falls by gravity. As the free end 22 of the inlet tube 20 is exposed, more sand will be delivered to the chamber 26 by the pressurizing apparatus 58. If the locomotive sandbox fills up, sand stops flowing out the gravity hose 36, and backs up into the separation device 10, covering the free end 22 of the tube 20. This, coupled with the design of the separation device, 10 creates a back-pressure on the pneumatic feed of sand into the separation device, ultimately stopping the filling process. The system 50 can remain pressurized until additional gravity feed out the device 10 un-covers the free end 22, removing the back-pressure and allowing sand to resume filling the separation device.

While a particular embodiment of the present pneumatically powered locomotive sander has been described herein, it will be appreciated by those skilled in the art that changes and modifications may be made thereto without departing from the invention in its broader aspects and as set forth in the following claims.

The invention claimed is:

1. A separation device for use with a locomotive sanding system, comprising:
    a body defining a chamber having a floor and configured to receive material, and having an intake port connected to an inlet tube with a free end spaced a designated distance from the floor, wherein when a height of the material supplied to said chamber is equal to or greater than said designated distance such that said free end is covered by the material, the material is not supplied through said inlet tube to said chamber, and when the height of the material supplied to said chamber is less than said designated distance such that said free end is not covered by the material, the material is supplied through said inlet tube to said chamber;
    an outlet port at an opposite end of the body from the intake port;
    a sand fill hose connected to the outlet; and
    a sand nozzle connected to the sand fill hose.

2. The separation device of claim 1 further including a dust exhaust port connected to the body.

3. The separation device of claim 2 where the dust exhaust port is adjacent the intake port.

4. The separation device of claim 1 further including a sight glass on said body.

5. The separation device of claim 4, where said sight glass is located on said body to be above a level of sand in said chamber sufficient to cover said free end and shut off flow of sand into said chamber.

6. The separation device of claim 1 being constructed and arranged so that sand stored in said chamber exits said outlet port via gravity, and sand is simultaneously delivered under pressure into said chamber through said intake port.

7. A locomotive sand delivery system, comprising:
a hopper;
a pressurizing apparatus constructed and arranged for drawing sand from the hopper and feeding it under pressure to a sand delivery conduit;
a support frame associated with said hopper and supporting a pivoting beam;
a separation device movably connected to said beam, said device constructed and arranged for receiving sand under pressure from the hopper and delivering the sand by gravity to a locomotive, said separation device including a body defining a chamber and having an intake port connected to an inlet tube with a free end spaced a designated distance from a floor of the body, and an outlet port at an opposite end of the body from the intake port, wherein when a height of the sand supplied to said chamber is equal to or greater than said designated distance such that said free end is covered by the sand, the sand is not supplied through said inlet tube to said chamber, and when the height of the material supplied to said chamber is less than said designated distance such that said free end is not covered by the sand, the sand is supplied through said inlet tube to said chamber.

8. The system of claim 7 wherein the separation device delivers sand to the locomotive without the use of sensors or valves.

9. The system of claim 8 wherein said separation device is constructed and arranged so that sand stored in said chamber exits said outlet port via gravity, and sand is simultaneously delivered under pressure into said chamber through said intake port.

10. The system of claim 7, wherein said separation device includes a sand fill hose connected to the outlet and a sand nozzle connected to the sand fill hose.

* * * * *